US011988346B2

(12) United States Patent
Patton et al.

(10) Patent No.: US 11,988,346 B2
(45) Date of Patent: May 21, 2024

(54) ELECTRIC LIGHTING DEVICES

(71) Applicant: L&L Candle Company, LLC, Brea, CA (US)

(72) Inventors: Douglas Patton, Irvine, CA (US); James LaBelle, Eden Prairie, MN (US); Jeffrey Thompson, Huntington Beach, CA (US)

(73) Assignee: L&L Candle Company, LLC, Brea, CA (US)

( * ) Notice: Subject to any disclaimer, the term of this patent is extended or adjusted under 35 U.S.C. 154(b) by 0 days.

(21) Appl. No.: 17/982,130

(22) Filed: Nov. 7, 2022

(65) Prior Publication Data

US 2023/0126477 A1 Apr. 27, 2023

Related U.S. Application Data

(63) Continuation of application No. 17/459,146, filed on Aug. 27, 2021, now Pat. No. 11,493,182, which is a (Continued)

(51) Int. Cl.
*F21S 10/04* (2006.01)
*F21L 4/00* (2006.01)
(Continued)

(52) U.S. Cl.
CPC ............. *F21S 10/046* (2013.01); *F21S 6/001* (2013.01); *F21V 3/02* (2013.01); *F21V 15/01* (2013.01);
(Continued)

(58) Field of Classification Search
CPC ........... F21S 10/046; F21S 6/001; F21V 3/02; F21V 15/01; F21V 23/04; F21V 23/0414;
(Continued)

(56) References Cited

U.S. PATENT DOCUMENTS 4,388,674 A 6/1983 Sano
7,159,994 B2 1/2007 Schnuckle et al.
(Continued)

FOREIGN PATENT DOCUMENTS

CA 2779978 A1 1/2012
CA 2886665 A1 1/2012
(Continued)

OTHER PUBLICATIONS

Nantong Yatai Candle Arts & Crafts Co. Ltd et al., "Electric Candle With Wavering Flame", Jun. 14, 2012, Deutsches Patent-und Markenamt, DE 20 2012 003 498 U1 image with merged English Machine Translation text, 7 pages of image document then translation text. (Year: 2012).*
(Continued)

*Primary Examiner* — Alan B Cariaso
(74) *Attorney, Agent, or Firm* — Perkins Coie LLP

(57) ABSTRACT

Various embodiments of electric lighting devices and, in particular, electric candles are described. The devices can include a flame element onto which light can be projected from a light source. Preferably, the light is projected within a focal area on the flame element. The housing of the devices can include projections that help maintain a vertical position of a circuit board within the housing.

11 Claims, 13 Drawing Sheets

Related U.S. Application Data continuation of application No. 17/035,224, filed on Sep. 28, 2020, now Pat. No. 11,105,479, which is a continuation of application No. 15/676,118, filed on Aug. 14, 2017, now Pat. No. 10,788,178, which is a continuation of application No. 15/039,546, filed as application No. PCT/US2015/011642 on Jan. 15, 2015, now Pat. No. 9,752,742.

(60) Provisional application No. 61/929,284, filed on Jan. 20, 2014, provisional application No. 61/927,896, filed on Jan. 15, 2014.

(51) Int. Cl.

| | |
|---|---|
| ***F21S 6/00*** | (2006.01) |
| ***F21V 3/02*** | (2006.01) |
| ***F21V 15/01*** | (2006.01) |
| ***F21V 23/04*** | (2006.01) |
| ***F21W 121/00*** | (2006.01) |
| ***H01F 7/06*** | (2006.01) |

(52) U.S. Cl.
CPC .......... *F21V 23/04* (2013.01); *F21V 23/0435* (2013.01); *H01F 7/064* (2013.01); *F21L 4/00* (2013.01); *F21V 23/0421* (2013.01); *F21W 2121/00* (2013.01); *H01F 2007/068* (2013.01); *Y10S 362/81* (2013.01)

(58) Field of Classification Search
CPC ............. F21V 23/0421; F21V 23/0435; F21V 23/045; H01F 7/064; H01F 2007/068; F21L 4/00; F21W 2121/00; Y10S 362/81
See application file for complete search history.

(56) References Cited

U.S. PATENT DOCUMENTS

| | | | |
|---|---|---|---|
| 7,261,455 | B2 | 8/2007 | Schnuckle et al. |
| 7,350,720 | B2 | 4/2008 | Jaworski et al. |
| 7,481,571 | B2 | 1/2009 | Bistritzky et al. |
| 7,503,668 | B2 | 3/2009 | Porchia et al. |
| 7,677,753 | B1 * | 3/2010 | Wills .................. F21V 23/0435 362/161 |
| 7,824,627 | B2 | 11/2010 | Michaels et al. |
| 7,837,355 | B2 | 11/2010 | Schnuckle et al. |
| 8,070,319 | B2 | 12/2011 | Schnuckle et al. |
| 8,132,936 | B2 | 3/2012 | Patton et al. |
| 8,342,712 | B2 | 1/2013 | Patton et al. |
| 8,469,540 | B1 | 6/2013 | Gregory et al. |
| 8,534,869 | B2 | 9/2013 | Patton et al. |
| 8,550,660 | B2 | 10/2013 | Patton et al. |
| 8,628,223 | B2 | 1/2014 | Kwok et al. |
| 8,646,946 | B2 | 2/2014 | Schnuckle et al. |
| 8,696,166 | B2 | 4/2014 | Patton et al. |
| 8,721,118 | B2 | 5/2014 | Patton et al. |
| 8,727,569 | B2 | 5/2014 | Schnuckle et al. |
| 8,777,465 | B2 | 7/2014 | Patton et al. |
| 8,789,986 | B2 | 7/2014 | Li |
| 8,926,137 | B2 | 1/2015 | Li |
| 9,322,522 | B2 | 4/2016 | Hau et al. |
| 9,574,748 | B2 | 2/2017 | Dong |
| 9,752,742 | B2 | 9/2017 | Patton et al. |
| 10,788,178 | B2 | 9/2020 | Patton et al. |
| 11,105,479 | B2 | 8/2021 | Patton et al. |
| 11,493,182 | B2 * | 11/2022 | Patton .................. F21S 10/046 |
| 2001/0033488 | A1 | 10/2001 | Chliwnyj et al. |
| 2004/0264169 | A1 | 12/2004 | Limburg et al. |
| 2005/0169666 | A1 | 8/2005 | Porchia et al. |
| 2005/0285538 | A1 | 12/2005 | Jaworski et al. |
| 2006/0039835 | A1 | 2/2006 | Nottingham et al. |
| 2006/0125420 | A1 | 6/2006 | Boone et al. |
| 2006/0146544 | A1 | 7/2006 | Leung |
| 2006/0232958 | A1 * | 10/2006 | Chang ...................... F21S 9/02 362/190 |
| 2007/0127249 | A1 | 6/2007 | Medley et al. |
| 2007/0223238 | A1 | 9/2007 | Jensen |
| 2008/0031784 | A1 | 2/2008 | Bistritzky et al. |
| 2008/0038156 | A1 | 2/2008 | Jaramillo |
| 2008/0094825 | A1 * | 4/2008 | Silver .................. H05B 47/165 362/161 |
| 2008/0130266 | A1 | 6/2008 | DeWitt et al. |
| 2008/0150453 | A1 * | 6/2008 | Medley .................. H05B 45/44 315/312 |
| 2011/0027124 | A1 | 2/2011 | Albee et al. |
| 2011/0110073 | A1 | 5/2011 | Schnuckle et al. |
| 2011/0127914 | A1 | 6/2011 | Palton et al. |
| 2011/0134628 | A1 | 6/2011 | Pestl et al. |
| 2011/0317403 | A1 * | 12/2011 | Fournier .................. F21S 9/02 362/183 |
| 2012/0020052 | A1 | 1/2012 | McCavit et al. |
| 2012/0024837 | A1 | 2/2012 | Thompson |
| 2012/0093491 | A1 | 4/2012 | Browder et al. |
| 2012/0134157 | A1 | 5/2012 | Li |
| 2014/0104812 | A1 | 4/2014 | Patton et al. |
| 2014/0177212 | A1 | 6/2014 | Li |
| 2015/0109786 | A1 | 4/2015 | Li |
| 2016/0047517 | A1 | 2/2016 | Li |
| 2016/0109082 | A1 | 4/2016 | Li |
| 2016/0290606 | A1 | 10/2016 | Honold et al. |
| 2022/0049828 | A1 | 2/2022 | Patton et al. |

FOREIGN PATENT DOCUMENTS

| | | | | |
|---|---|---|---|---|
| CN | 101865413 | B | 10/2010 | |
| CN | 101918755 | A | 12/2010 | |
| CN | 201724143 | U | 1/2011 | |
| CN | 102147095 | A | 8/2011 | |
| CN | 202032445 | U | 11/2011 | |
| CN | 102352966 | A | 2/2012 | |
| CN | 202215951 | U | 5/2012 | |
| CN | 102734740 | A | 10/2012 | |
| CN | 102748589 | A | 10/2012 | |
| CN | 203024053 | U | 6/2013 | |
| CN | 103471028 | A | 12/2013 | |
| CN | 203571616 | U | 4/2014 | |
| CN | 102721002 | B | 6/2014 | |
| DE | 202005001373 | U1 * | 5/2005 | .............. F21S 6/001 |
| DE | 202012003498 | U1 * | 6/2012 | ............ F21S 10/046 |
| EP | 2565518 | A1 | 3/2013 | |
| EP | 2587127 | A1 | 5/2013 | |
| JP | 2006-351360 | A | 12/2006 | |
| KR | 10-1005154 | B1 | 1/2011 | |
| KR | 10-1174246 | B1 | 8/2012 | |
| WO | 96/25624 | | 8/1996 | |
| WO | 2006/020839 | A2 | 2/2006 | |
| WO | 2012/162538 | A1 | 11/2012 | |
| WO | 2014/036968 | A1 | 3/2014 | |
| WO | 2015/080664 | A1 | 6/2015 | |
| WO | 2015/109115 | A1 | 7/2015 | |

OTHER PUBLICATIONS

Baarz/Niessen et al., "Remotely Controlled Decorative Light Has A Receiver And Decoder To Control Battery Powered LED Light", May 12, 2005, DE 202005001373 U1 image with merged English Machine Translation text of Abstract, 13 pages of image document then English Abstract text. (Year: 2005).*

U.S. Appl. No. 61/927,896, filed Jan. 15, 2014 (49 pages).

U.S. Appl. No. 61/929,284, filed Jan. 20, 2014 (48 pages).

International Search Report and Written Opinion for International Patent Application No. PCT/US2015/011642, dated Apr. 24, 2015 (13 pages).

* cited by examiner

FIG. 1B
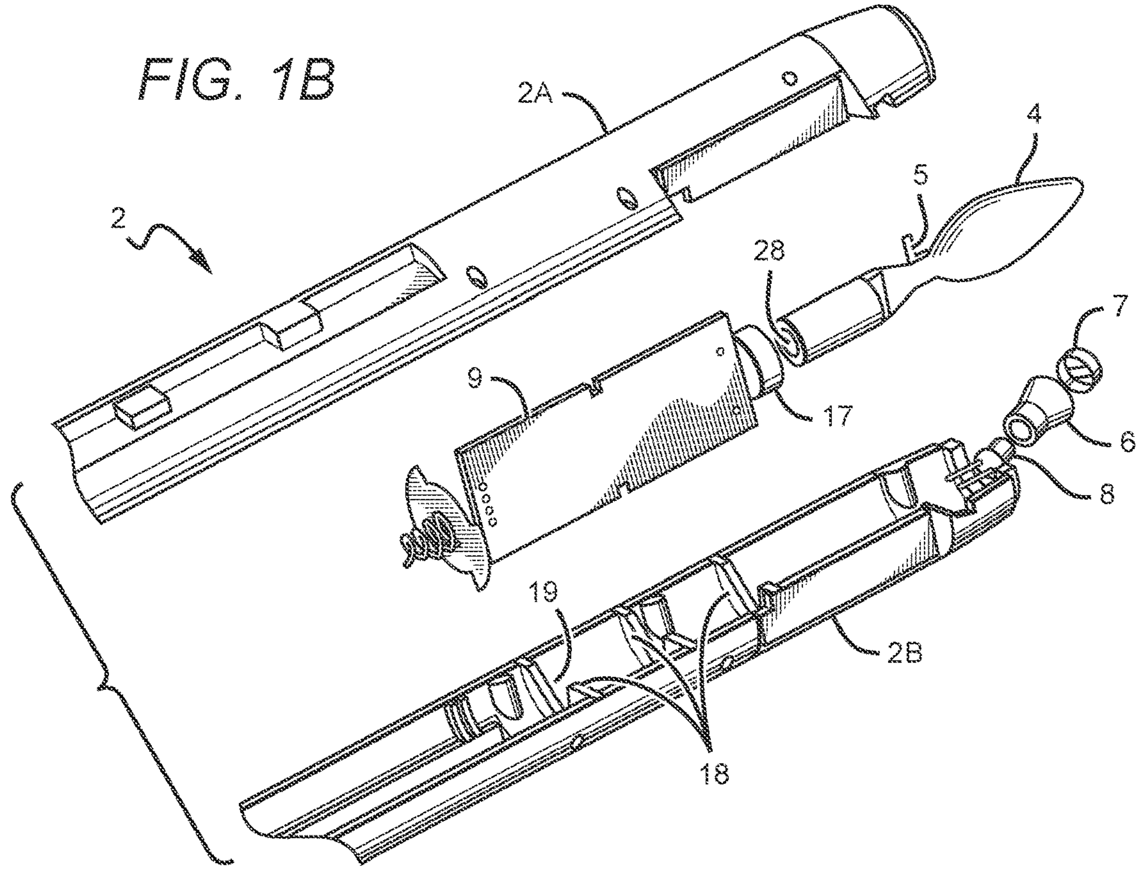
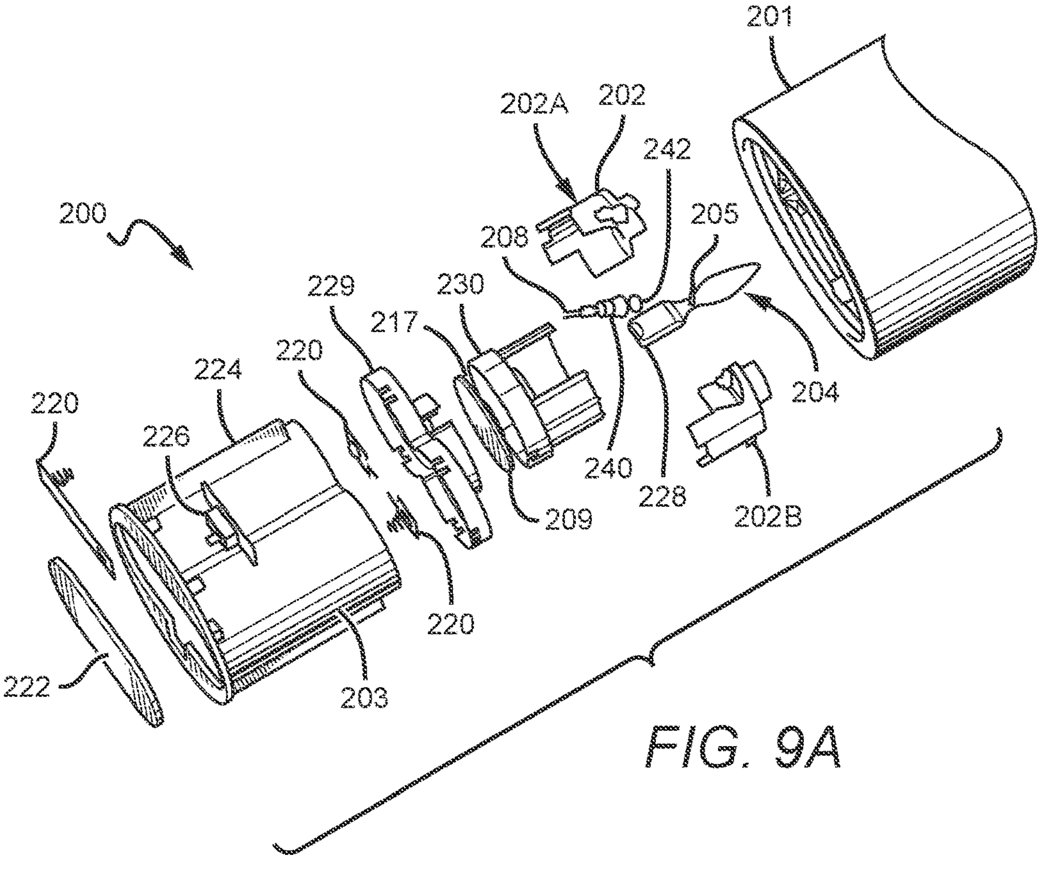
FIG. 9A

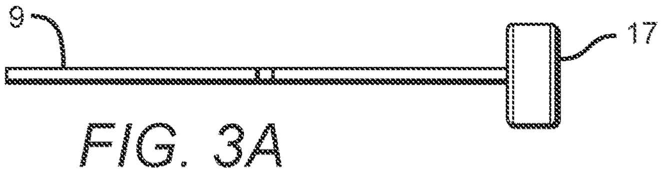
FIG. 3A
FIG. 3B
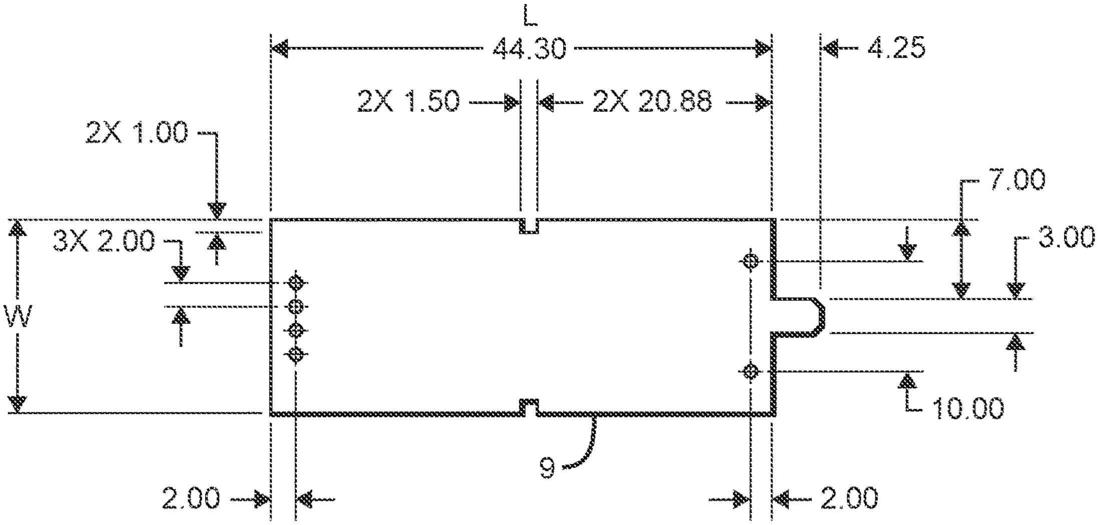
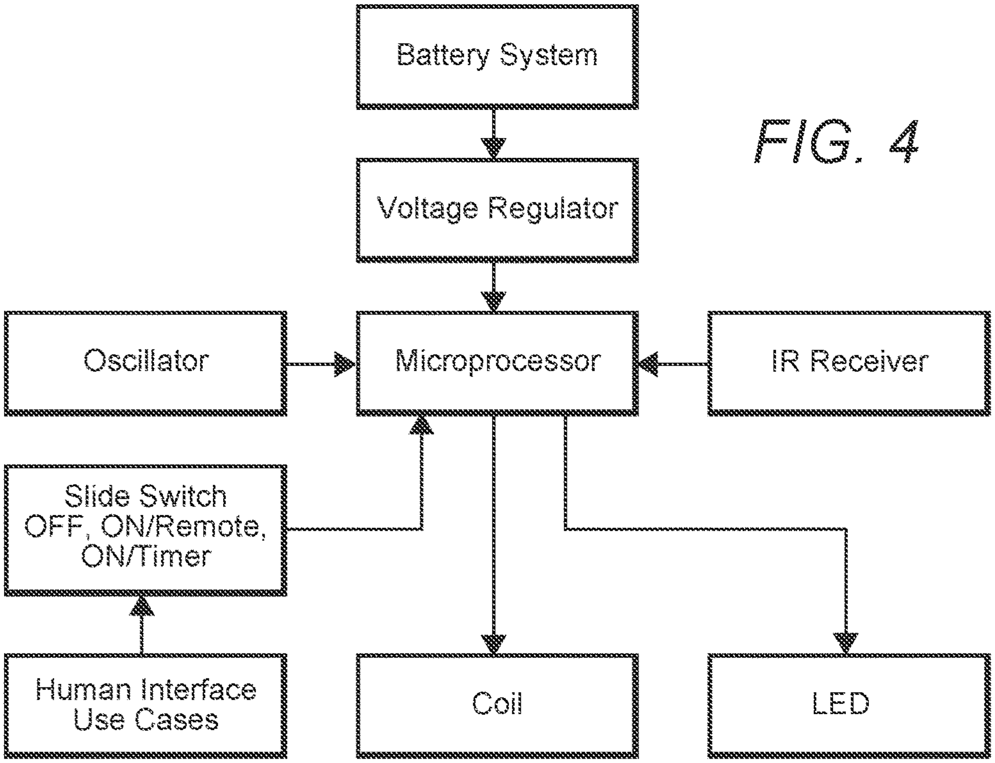
FIG. 4

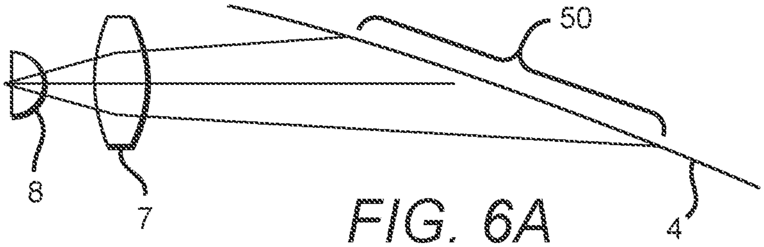
FIG. 6A
FIG. 6B
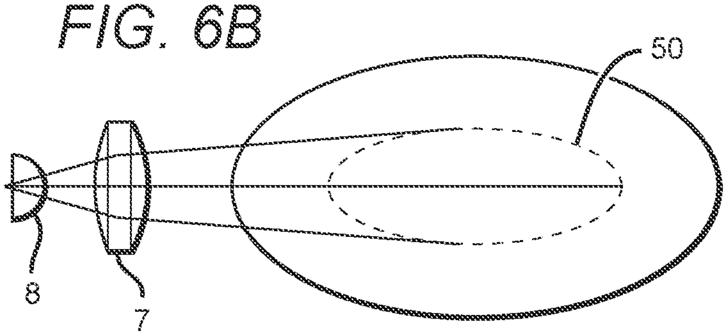
FIG. 9B
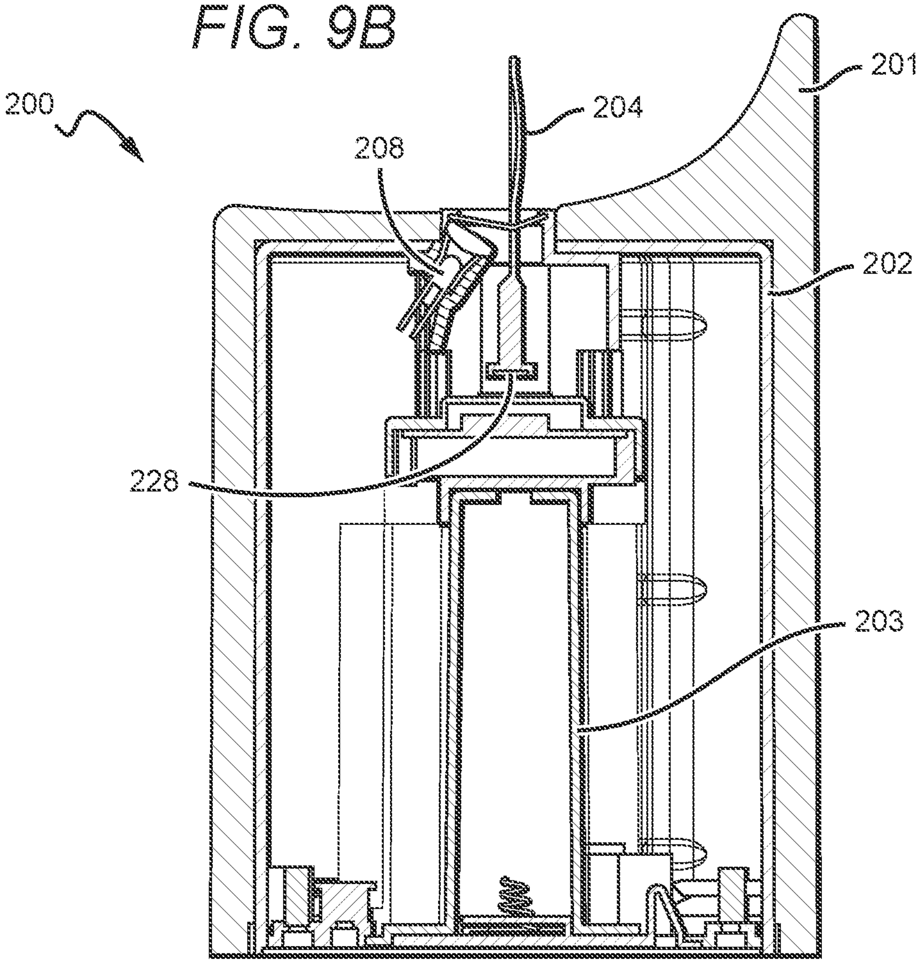

ELECTRIC LIGHTING DEVICES

This patent document is a continuation of U.S. patent application Ser. No. 17/459,146, filed Aug. 27, 2021, which is a continuation of U.S. patent application Ser. No. 17/035,224, filed Sep. 28, 2020, now U.S. Pat. No. 11,105,479, which is a continuation of U.S. patent application Ser. No. 15/676,118, filed Aug. 14, 2017, now U.S. Pat. No. 10,788,178, which is a continuation of U.S. patent application having Ser. No. 15/039,546 filed on May 26, 2016, now U.S. Pat. No. 9,752,742, which itself is a U.S. National Phase of PCT/US15/11642, filed Jan. 15, 2015, which claims priority to U.S. provisional application having Ser. No. 61/927,896 and filed on Jan. 15, 2014 and U.S. provisional application having Ser. No. 61/929,284 filed on Jan. 20, 2014. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is electric lighting devices, and in particular, electric candles.

BACKGROUND

The following description includes information that may be useful in understanding the present invention. It is not an admission that any of the information provided herein is prior art or relevant to the presently claimed invention, or that any publication specifically or implicitly referenced is prior art.

Various electric lights are known in the art. See, e.g., U.S. Pat. No. 8,132,936 to Patton et al., U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al., US 2011/0127914 to Patton et al., U.S. Pat. No. 7,350,720 to Jaworski et al.; US 2005/0285538 to Jaworski et al. (publ. December 2005); U.S. Pat. No. 7,481,571 to Bistritzky et al.; US 2008/0031784 to Bistritzky et al. (publ. February 2008); US 2006/0125420 to Boone et al. (publ. June 2006); US 2007/0127249 to Medley et al. (publ. June 2007); US 2008/0150453 to Medley et al. (publ. June 2008); US 2005/0169666 to Porchia, et al. (publ. August 2005); U.S. Pat. No. 7,503,668 to Porchia, et al.; U.S. Pat. No. 7,824,627 to Michaels, et al.; US 2006/0039835 to Nottingham et al. (publ. February 2006); US 2008/0038156 to Jaramillo (publ. February 2008); US 2008/0130266 to DeWitt et al. (publ. June 2008); US 2012/0024837 to Thompson (publ. February 2012); US 2011/0134628 to Pestl et al. (publ. June 2011); US 2011/0027124 to Albee et al. (publ February 2011); US 2012/0020052 to McCavit et al. (publ. January 2012); and US 2012/0093491 to Browder et al. (publ. April 2012). However, all the electric lights known to Applicant suffer from one or more disadvantages.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

For example, although tapered electric lights are known, they either fail to produce a realistic flame effect or are overly complex increasing the time and cost of manufacture.

Thus, there is still a need for tapered and other electric lights that produce a realistic flame effect while having a reducing time and cost of manufacture.

SUMMARY OF THE INVENTION

The inventive subject matter provides apparatus, systems and methods in which an artificial candle (electric lighting device) simulates a real taper candle or pillar candle, for example, with a wick or a pendulum with a flame-shaped element. Preferably, the candle is powered by batteries, has circuitry to work in conjunction with a drive mechanism to move the pendulum and has an LED that illuminates the flame-shaped element continuously. The pendulum is preferably located in the center near the top of the candle. The LED or other light source illuminates the flame-shaped element by directing light at its surface, and preferably at a front surface or face of the element. An infrared remote receiver can be located in the front of the candle near its top.

The candle can include inner and outer housings, where the inner housing is disposed within the outer housing. An elongated circuit board can be disposed within the inner housing and coupled to the power supply. An electromagnet acting as the drive mechanism can be coupled to a first side of the circuit board, and generates a magnetic field that interacts with a magnet coupled to the pendulum, and thereby causes movement of the pendulum with respect to the housing.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1B is an enlarged view of a portion of FIG. 1A.

FIGS. 3A-3B are side and front views, respectively, of an embodiment of a circuit board.

FIG. 4 is a diagram of one embodiment of a control system of an electric lighting device.

FIGS. 6A-6B are diagrams showing a focal area of light on a flame element.

FIG. 9A is an exploded view of one embodiment of an electric lighting device having a pillar candle shape.

FIG. 9B is a vertical cross-section view of the assembled device of FIG. 9A.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
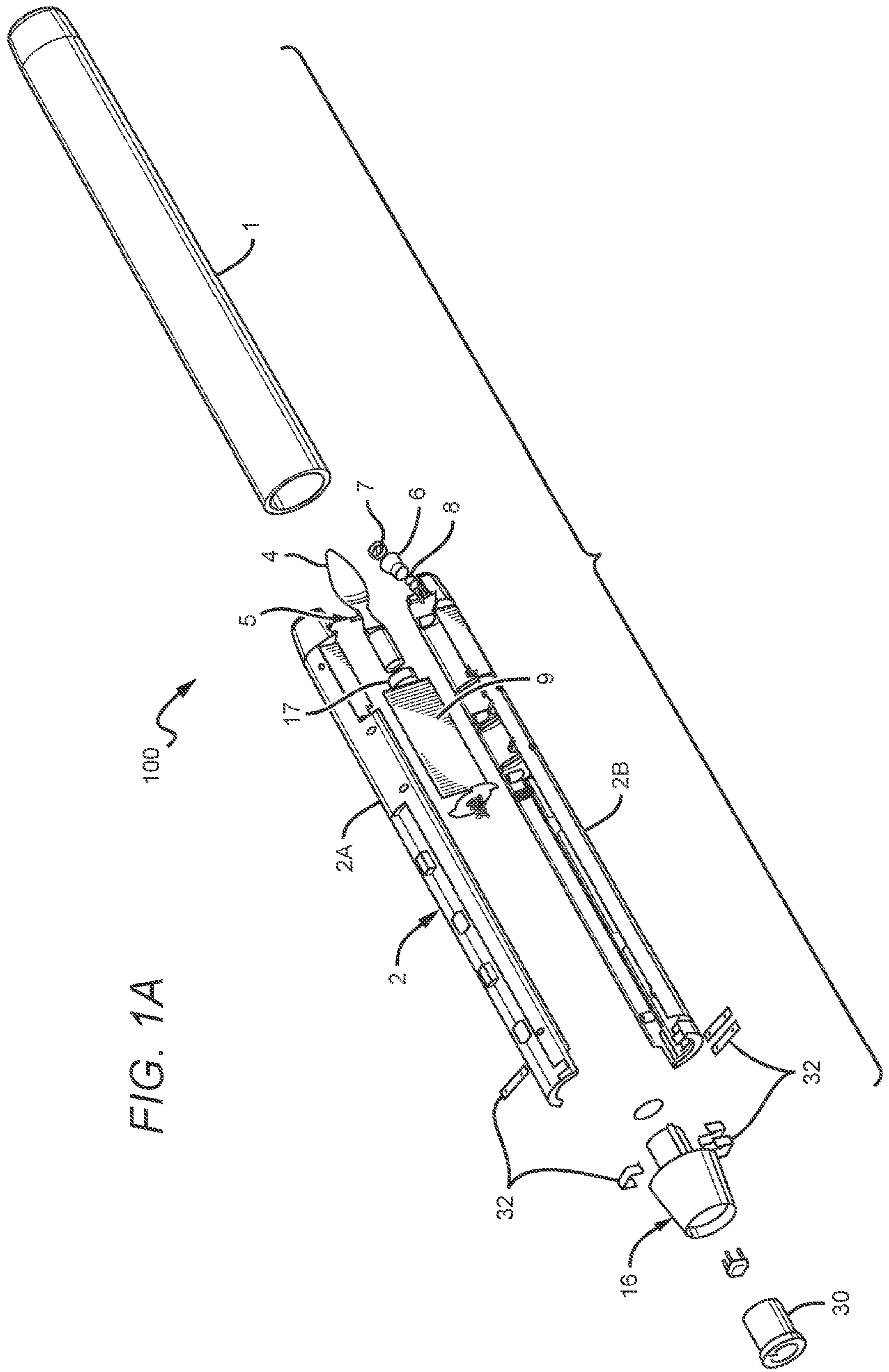
FIG. 1A is an exploded view of one embodiment of an electric lighting device having a tapered candle shape.
Figure 1C:
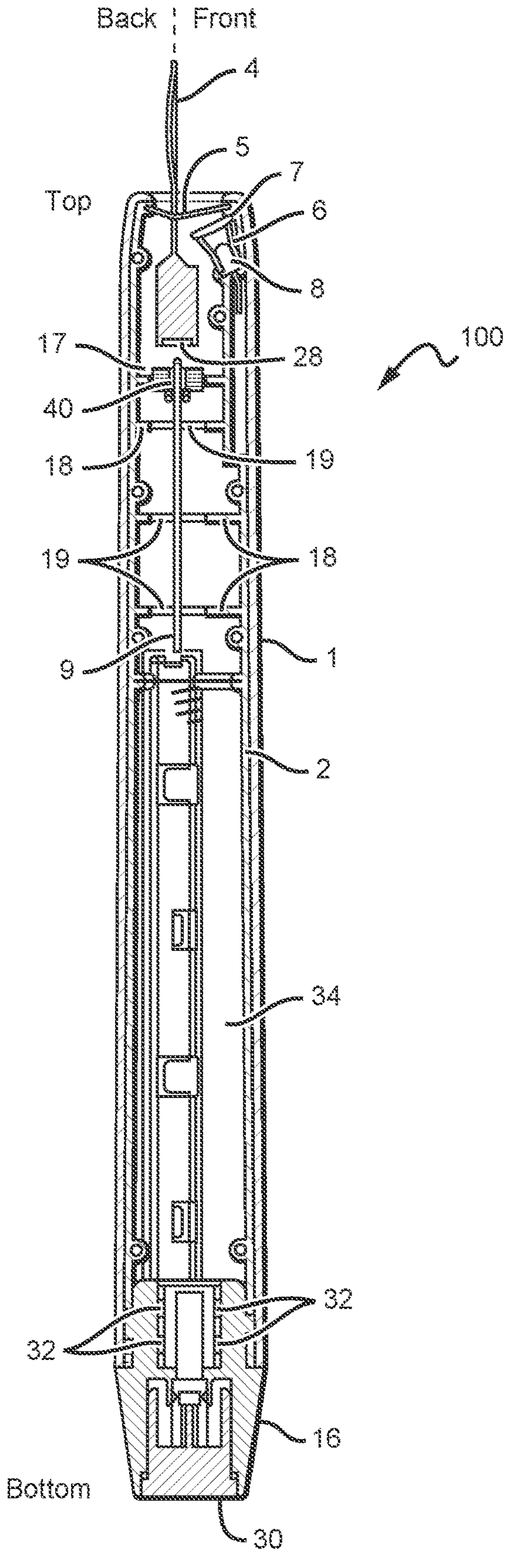
FIG. 1C is a vertical cross-section view of the device of FIG. 1A.
Figure 1D:
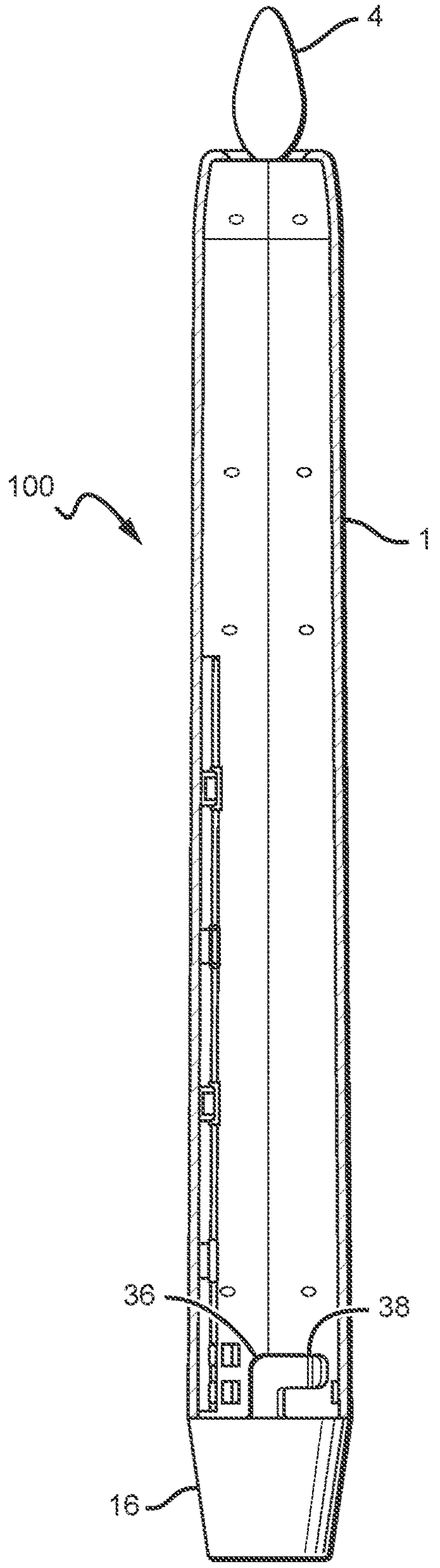
FIG. 1D is a side view of the device of FIG. 1A.
Figure 1E:
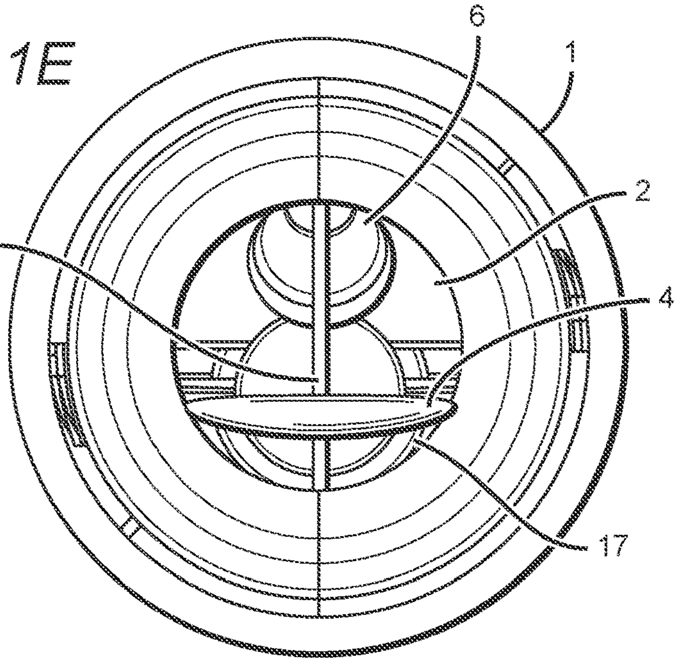
FIGS. 1E and 1F are top and bottom views, respectively, of the device of FIG. 1A.
Figure 1F:
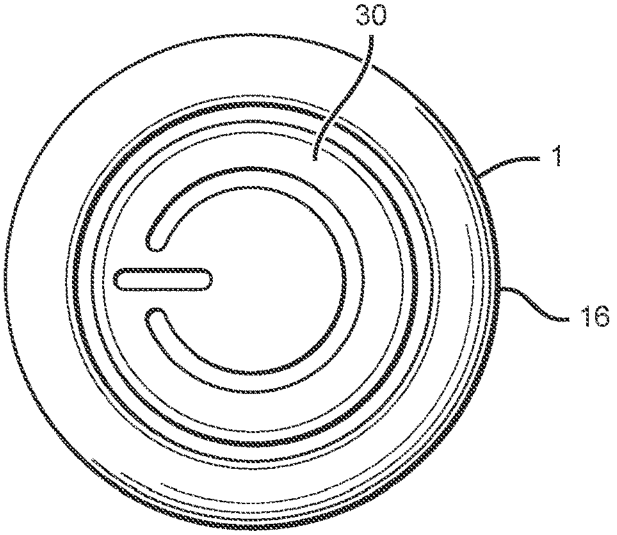
Figure 2:
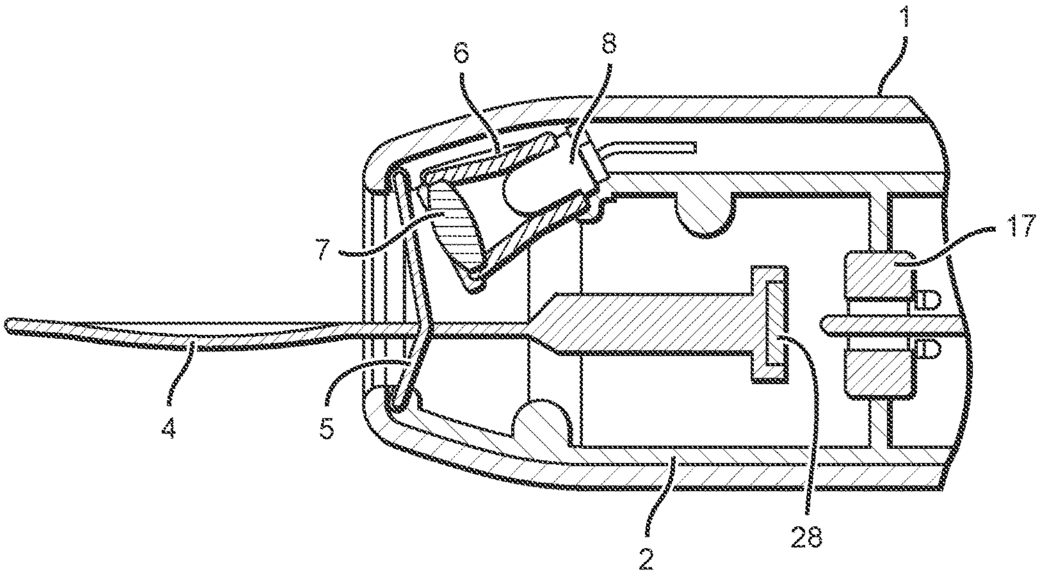
FIG. 2 is a vertical cross-section view of an upper portion of another embodiment of an electric lighting device.

FIGS. 1A-2 illustrates various views of one embodiment of a tapered electric lighting device 100 and its components, which collectively simulate a flickering flame. Device 100 has an outer housing 1. Device 100 further includes an inner housing 2, preferably comprising a left side 2A and a right side 2B, which are configured to mater with one another and can be coupled together using opposing pegs and holes, crush pins, adhesive, or other commercially suitable fastener (s).

A pendulum 4 having a flame-shaped element on a first end can be coupled to the housing 2 via wire 5, such that the pendulum 4 can pivot or otherwise move about the wire 5 and thereby vary its position with respect to housing 2. Pendulum 4 preferably includes upper and lower portions, with the upper portion disposed above where the wire 5 passes through the pendulum 4, and the lower portion disposed below that point. The upper portion can include the flame-shaped element having a concave surface defining a face of the element and onto which light is preferably emitted by light source 8. Of course, planar and other dimensional surfaces could alternatively be used without departing from the scope of the invention.

It is especially preferred that the wire extends transversely across the housing 2, such that the wire 5 does not cross and thereby block a path of light from the light source 8 to the flame-shaped element. In alternative embodiments, the pendulum 4 could be supported via a pin or other support means without departing from the scope of the invention.

It is alternatively contemplated that the pendulum 4 could be fixed in position relative to the housing 2, and in some embodiments, could be affixed directly to the housing 2 or even be unitary with the housing 2.

Lighting device 100 can further include an elongated circuit board 9 (controller) that fits within the housing 2. In preferred embodiments, the circuit board 9 comprises top and bottom planar surfaces with at least three, and preferably four, sides that collectively define a perimeter of the circuit board 9. Preferably, where the pendulum 4 moves with respect to the housing 2, the circuit board 9 can include an electromagnet 17 coupled to an uppermost side of the circuit board 9 when the circuit board 9 is disposed within the housing 2, which is defined as the side of the circuit board 9 closest to the pendulum 4. In addition, as shown in more detail in FIGS. 3A-3B, the circuit board 9 can include a projection 40 about which the electromagnet 17 can be disposed. The projection 40 advantageously helps support and maintain a horizontal position of the electromagnet 17 relative to a horizontal position of the circuit board 9 without requiring the electromagnet 17 to be affixed directly to the circuit board 9 or other component of device 100. To restrict vertical movement of the electromagnet 17 while disposed on the circuit board 9, housing 2 can include upper and lower projections, which are disposed within the housing to extend on either side of the electromagnet 17. Preferably, the electromagnet 17 attaches to the projection 40 via a loose friction fit, such that adhesive is unnecessary.

Rather than an electromagnet, it is contemplated that the device 100 could alternatively include a fan or other device to move air within housing 2, or a mechanical device that contacts the pendulum 4 and thereby causes movement of the pendulum 4.

As shown in FIGS. 1 and 3B, the elongated circuit board 9 has a length L measured from a first side to a second side, and a width W measured from a third side to a fourth side. It is especially preferred that the length L is greater than the width W and that the circuit board 9 is disposed within the housing 2 such that the third and fourth sides are parallel to left and right sides 2A-2B, respectively, of the housing 2.

Electromagnet 17 preferably is configured to generate a magnetic field and is disposed with respect to the pendulum 4 such that a magnet 28 in the lower portion of the pendulum 4 interacts with the magnetic field, thereby causing movement of the pendulum 4 with respect to the housing 2. A currently preferred magnet is a neodymium magnet composed of NdFeB and having a diameter of approximately 5 mm and a thickness of between 0.9-1.0 mm. It is contemplated that a distance between a top of the electromagnet 17 and a bottom surface of the magnet 28 is between 3.5-4.0 mm, although the specific distance could vary depending on the overall scale of the device, the electromagnet field and the properties of the magnet 28.

In some embodiments, each of the left and right sides 2A-2B of housing 2 can have internal projections 18 that surround both sides of the board and thereby maintain a vertical position of the circuit board 9 relative to the housing 2. It is especially preferred that the projections 18 can each include an indentation or valley into which a portion of the circuit board 9 can rest. As shown in FIG. 1B, the projection 18 can include V-shape indentations 19, although U-shape or other shaped indentations could alternatively be used. In such embodiments, the circuit board 9 could also include indentations, each of which is wide enough to fit about a portion of the projection 18.

Device 100 is preferably battery-powered and comprises a battery compartment 34 that includes a cavity that can receive one or more batteries, and metal strips disposed parallel to a vertical axis of device 100 that electrically couple the battery compartment 34 to the circuit board 9. Preferably, device 100 includes a three-way switch 16 that work with metal contacts 32 and thus has three metal strips coupling the switch to the circuit board 9. A button 30 can be used to control the three-way switch 16. Preferably, material is heat staked over the electrical contacts 32. To secure the bottom of the device 100 to the housing, the switch which includes the plug can include one or more projections 36 configured to be inserted within a channel 38 in the housing. By inserting and then rotating the housing with respect to the plug, the plug can be secured to the housing.

It is especially preferred that the outer housing 1 can comprise a plastic material and more preferably a thermoplastic elastomer, and be co-injection molded with a wax substitute, which advantageously eliminates the need to dip the outer housing 1 in wax to provide a wax effect on the finished device.

Light source 8 is preferably disposed with the housing 2, and more preferably rests within one or more indentations of housing 2. A light source holder 6 having a conical shape could be employed to maintain a fixed position and distance between the light source 8 and lens 7. Alternatively, the housing 2 itself could include indentations into which the light source 8 and lens 7 could be inserted to maintain their relative positions. In such embodiments, the light source 8 emits light toward the pendulum 4 and on to a face of the flame-shaped element. Device 100 preferably includes a lens 7 that is configured to intercept at least some of the light emitted from the light source 8 and focus the intercepted light onto the flame-shaped element to generate a focal area of light that is preferably smaller than a surface area of the flame-shaped element. A preferred lens is an acrylic 6.4 mm lens.

A table of fabrication data of the preferred lens is shown below using a reference wavelength of 587.6 nm:

| Element No. | Radius of Curvature-Front | Radius of Curvature-Back | Thickness | Aperture Diameter-Front | Aperture Diameter-Back | Glass |
|---|---|---|---|---|---|---|
| | | Inf | 0.25 mm | | | |
| 1 | Inf | −1.5000 CX | 1.5 mm | 0.1868 mm | 3 mm | 300.5 |
| | | | 2.25 mm | | | |
| 2 | 5.8500 CX | −5.8500 CX | 2.5 mm | 3.2501 mm | 3.7035 mm | 491.59 |
| | | Aperture Stop | | 2.7035 | | Acrylic |
| | | | 0.0 | | | |
| | | Decenter(1) | | 18.7148 | | |
| | | | 2.0 | | | |
| | | Decenter(2) | | 18.8571 | | |
| | | Image Distance = | 0.0 | | | |

Notes: Positive radius indicates the center of curvature is to the right. Negative radius indicates the center of curvature is to the left. Thickness is axial distance to next surface. Image diameter shown above is a paraxial value. It is not a ray traced value.

Infinite Conjugates: EFL=3.8798; BFL=−1.4678; FFL=−0.8155; and F/NO=0.1873.

At Used Conjugates: Reduction=−6.8605; Finite F/NO=−9.8007; Object Distance=0.25; Total Track=8.5; Image Distance=0.0; OAL=8.25; Paraxial; Image HT=0.0; Image Distance=−28.0854; Semi-Field Angle=0.0; Entrance Pupil Diameter=20.7152; Distance=27.4713; Exit Pupil Diameter=2.8413; and Distance=−2.0.

In some contemplated embodiments, the lens 7 and light source 8 are spaced apart at a distance between 4-6 mm, and a distance between the lens 7 and the flame-shaped element is between 13-16 mm. Where the device resembles a tapered candle, it is contemplated that an angle at which the light impinges on the flame element is between 20-30 degrees. It is currently preferred that the angle is 26 degrees. Although the specific distances may vary, it is preferred that the overall ratio of (a) a distance between the lens and light source and (b) a distance between the lens and the flame element is between 0.30 and 0.35.

As shown in FIGS. 6A-6B, lens 7 can advantageously focus light emitted from light source 8 onto the flame-shaped element and within a focal area 50 that comprises a central portion of the flame element's face. Preferably, the flame element's face comprises the central portion and an outer border disposed about the central portion. In such embodiments, it is especially preferred that the outer border is sized such that the focal area of light remains on a face of the flame-shaped element as the pendulum 4 moves with respect to the housing 2. In this manner, as the flame movement pivots about wire 5, the focal area 50 of the light can remain on the face of the flame-shaped element, although covering a different portion of the flame element. This is maintained by ensuring that a maximum width of the outer border is greater than or equal to a maximum displacement of an edge of the flame element from a resting point. The outer border therefore provides space in x and y coordinates to allow for movement of the pendulum 4 without unnecessary spilling of excess light.

Figure 5A:
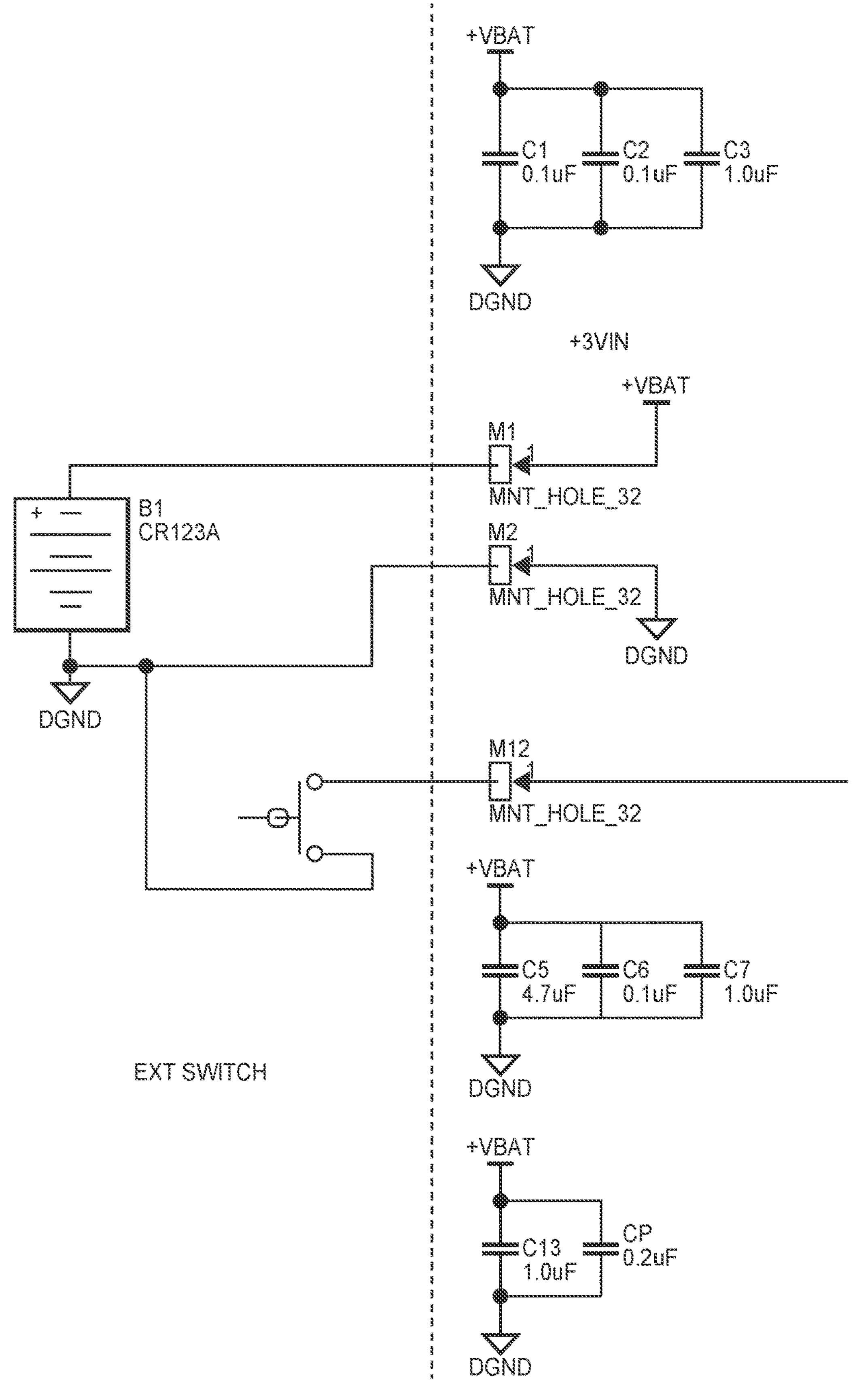
FIGS. 5A-5C collectively illustrate an electrical diagram of one embodiment of a tapered candle device, with FIG. 5A showing the left portion of the diagram, FIG. 5B showing the middle portion of the diagram, and FIG. 5C showing the right portion of the diagram.
Figure 5B:
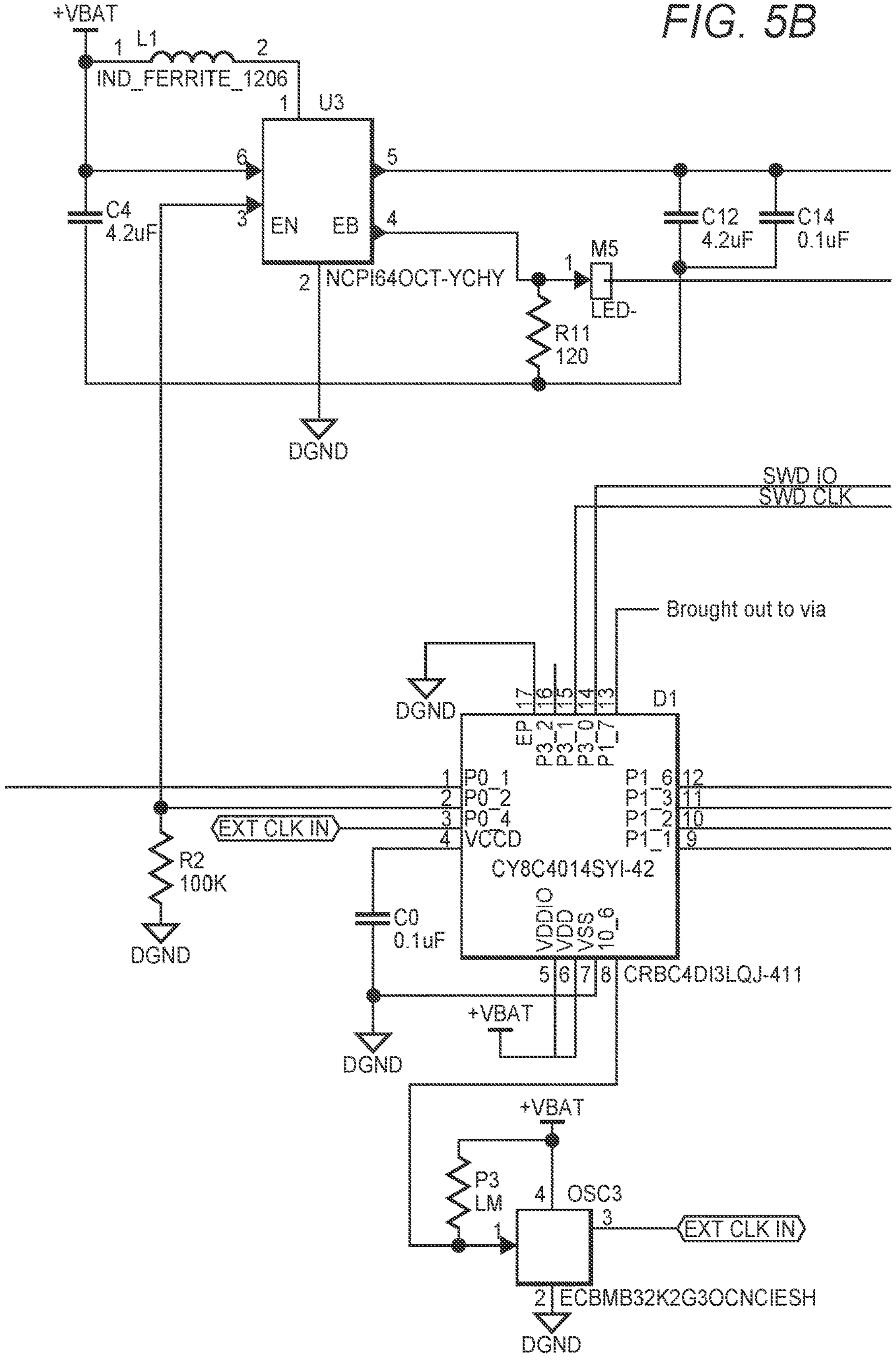
Figure 5C:
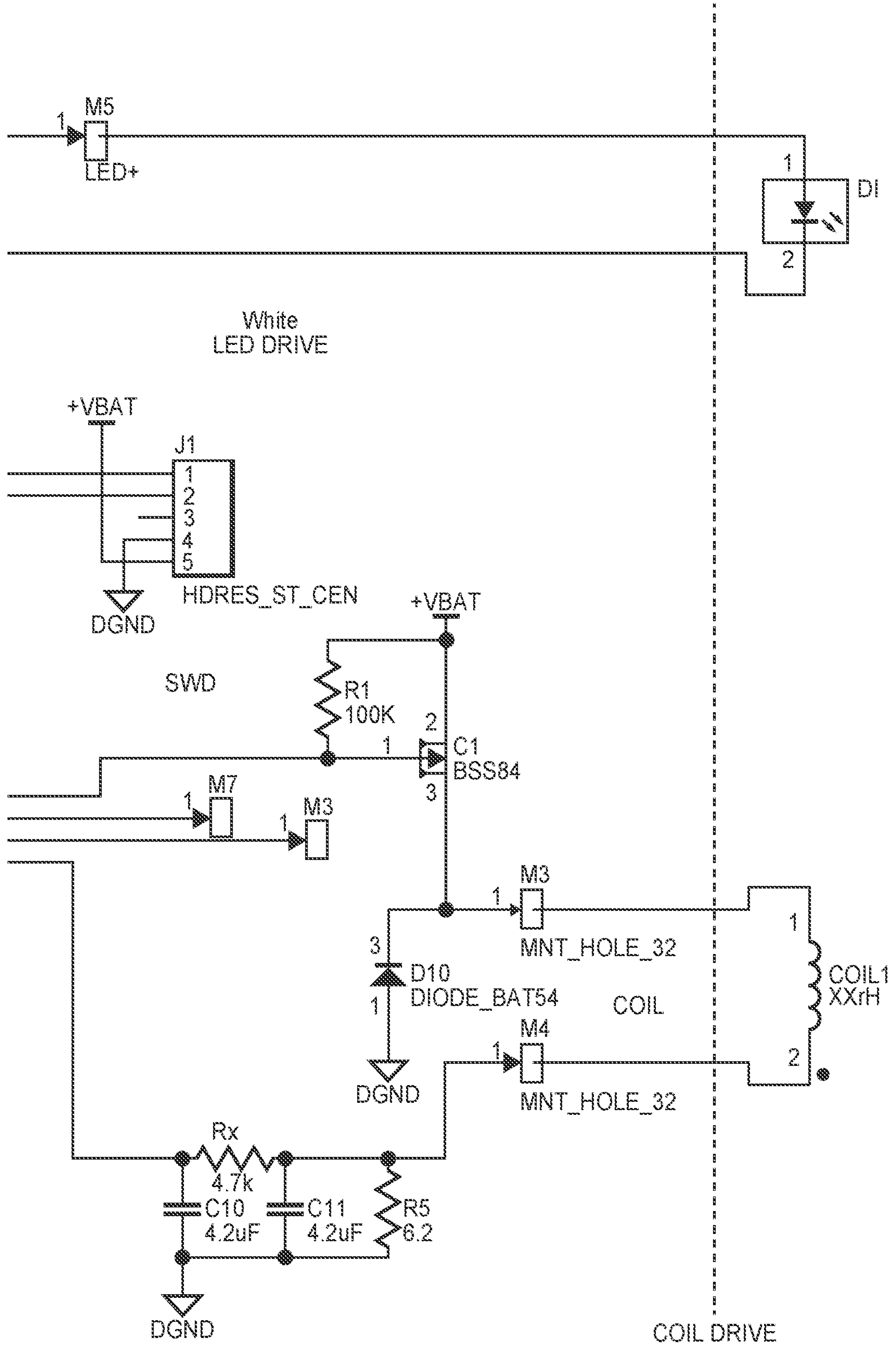

FIGS. 5A-5C collectively depict an electrical diagram showing an embodiment of a controller of device 100.

Device 100 can further include a signal generator that is preferably disposed with the housing 2, and configured to cause the electromagnet 17 or other drive mechanism to provide kinetic motion to the pendulum 4. Preferred signals have non-constant off-times. The signal generator can generate a signal that operates the drive mechanism. In one embodiment, the signal's waveform can have a constant high-time pulse of approximately 220 ms and a low-time (off) of approximately 375 ms. After a series of fifteen pulses, the off time increases to approximately 1.5 seconds. The high-pulse differential voltage is 0.5 volts.

Preferred signals include a waveform having non-constant off-times. For example, the waveform includes a series of square-wave pulses having an on-time of approximately 200 ms and an off-time of approximately 400 ms. For the 200 ms on-time with a 200 Ohm current setting resistor, 13 mA is flowing thru the electromagnet. The waveform continues to repeat at a rate of 1.67 Hz for 15 pulses after which there is an approximate 2-3 second alternating off-time after which the 15 pulse series repeats.

In another embodiment, the waveform can include a series of sets of pulses. After each set of fifteen pulses, there is an approximate 2-3 second off-time between the preceding set and the subsequent set of pulses. In yet another embodiment, the waveform can also include a series of square-wave pulses having an on-time of approximately 240 ms and an off-time of approximately 120 ms. For the 200 ms on-time with a 200 Ohm current setting resistor, 13 mA is flowing thru the electromagnet. The waveform continues to repeat at a rate of 2.7 Hz.

Yet another embodiment of a waveform can include sets of pulses. After each set of pulses, there is an approximate 1.2 second off-time between the preceding set and the subsequent set of pulses. Each of the sets of pulses can include a varying number of pulses that preferably is determined based on the following formula:

$$x=\text{number of pulses}(120\,ms\ LOW, 240\,ms\ \text{HIGH})$$

For (i=0 to x), call pulse routine;
Wait 1.2 s;
For (i=0 to (x+11)), call pulse routine;
Wait 1.2 s;

For (i=0 to (x+6)), call pulse routine;
Wait 1.2 s;
Increment x;
If (x+11)>16 then x=1;
Repeat from start.

As one example, the groupings can comprise the following sets of pulses: 5 pulses, 1.2 s pause, 16 pulses, 1.2 s pause, 11 pulses, 1.2 s pause, 6 pulses, 1.2 s pause, 1 pulse, 1.2 s pause, 12 pulses, 1.2 s pause, 7 pulses, 1.2 s pause, 2 pulses, 1.2 s pause, 13 pulses, 1.2 s pause, 8 pulses, 1.2 s pause, 3 pulses, 1.2 s pause, 14 pulses, 1.2 s pause, 9 pulses, 1.2 s pause, and then repeat.

FIG. 4 illustrates an exemplary system level diagram of the electric lighting device. In some embodiments, it is contemplated that the device can include the following modules in a control program: a timer mode, a pulse algorithm mode, and a standby mode. In the timer mode, it is contemplated that the device can simply be turned on and then off for preprogrammed time periods (e.g., 5 hours on-time and then 19 hours off-time). In the pulse algorithm mode, control can be provided for the electromagnet using pulses to simulate flame movement. In the standby mode, a microprocessor of device can periodically look for input from the push button switch and take action based upon one, two, or three pushes of the button (e.g., on, timer or off modes). Optionally, the device could include an IR remote mode, in which an IR Remote receiver receives a series of binary "on" or "off" commands that are interpreted by the microprocessor control program to turn on the electromagnet and light source.

Figure 7:
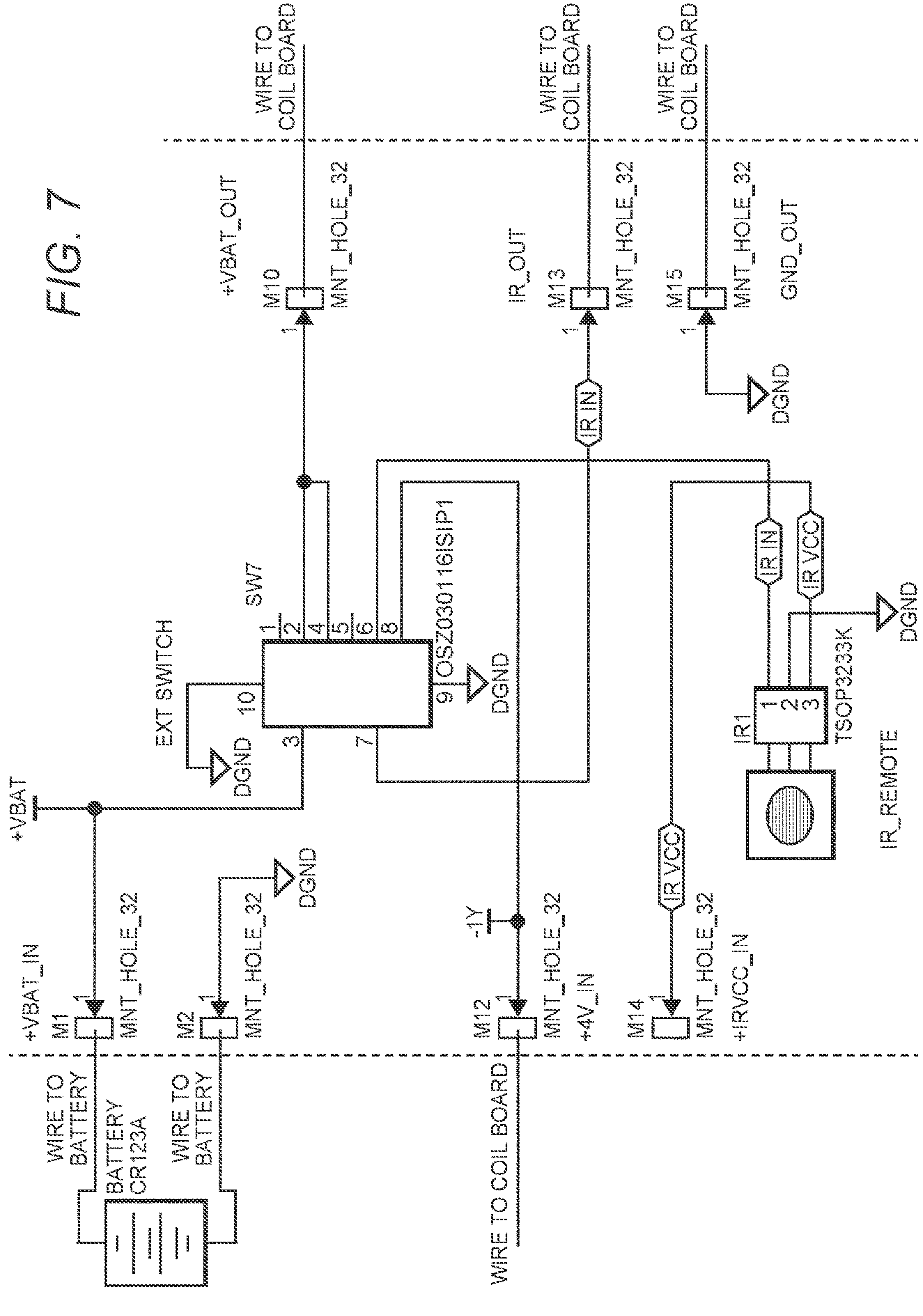
FIG. 7 is an electrical diagram of one embodiment of a switch.
Figure 8A:
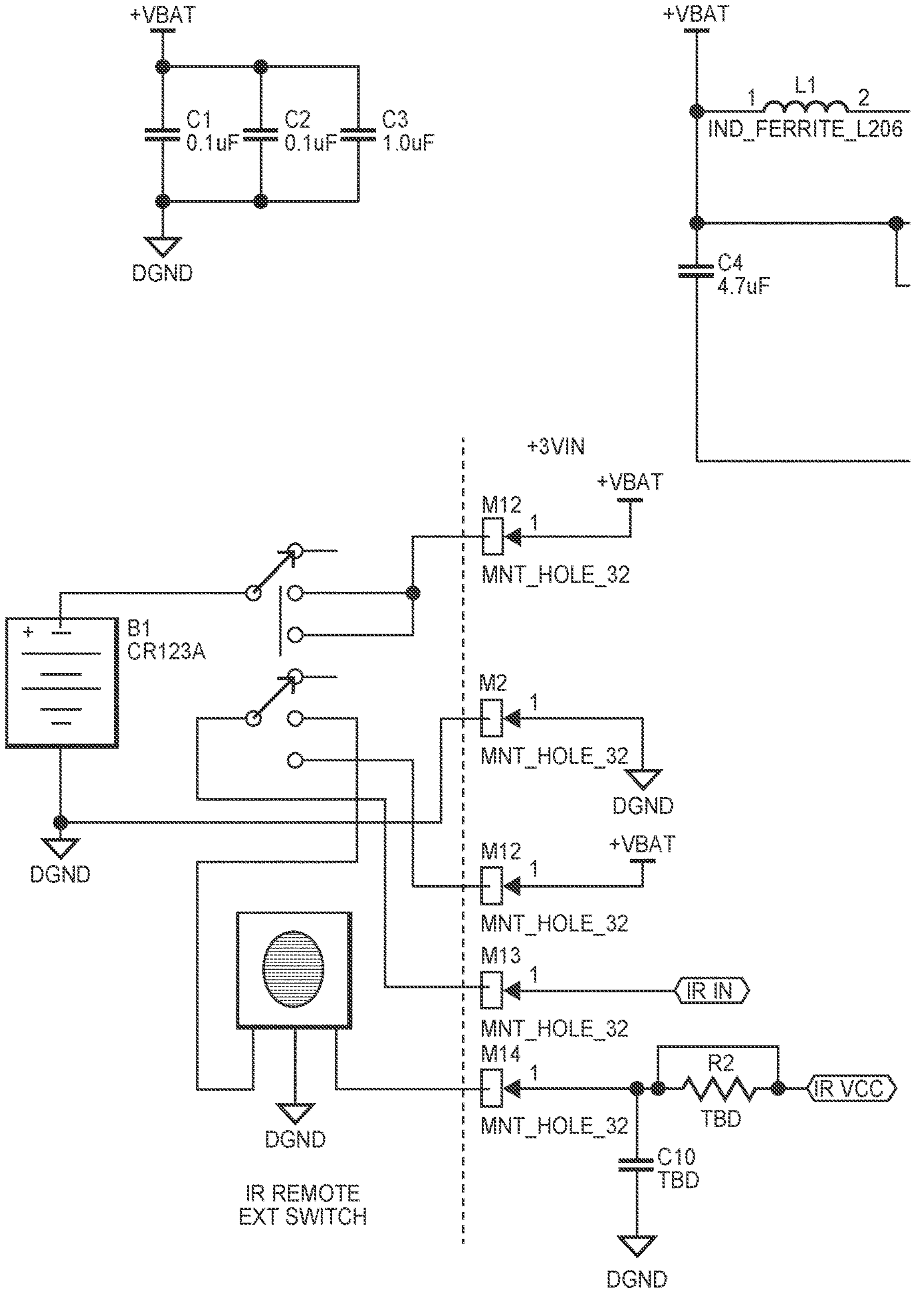
FIGS. 8A-8C collectively illustrate an electrical diagram of one embodiment of a pillar candle device, with FIG. 8A showing the left portion of the diagram, FIG. 8B showing the middle portion of the diagram, and FIG. 8C showing the right portion of the diagram.
Figure 8B:
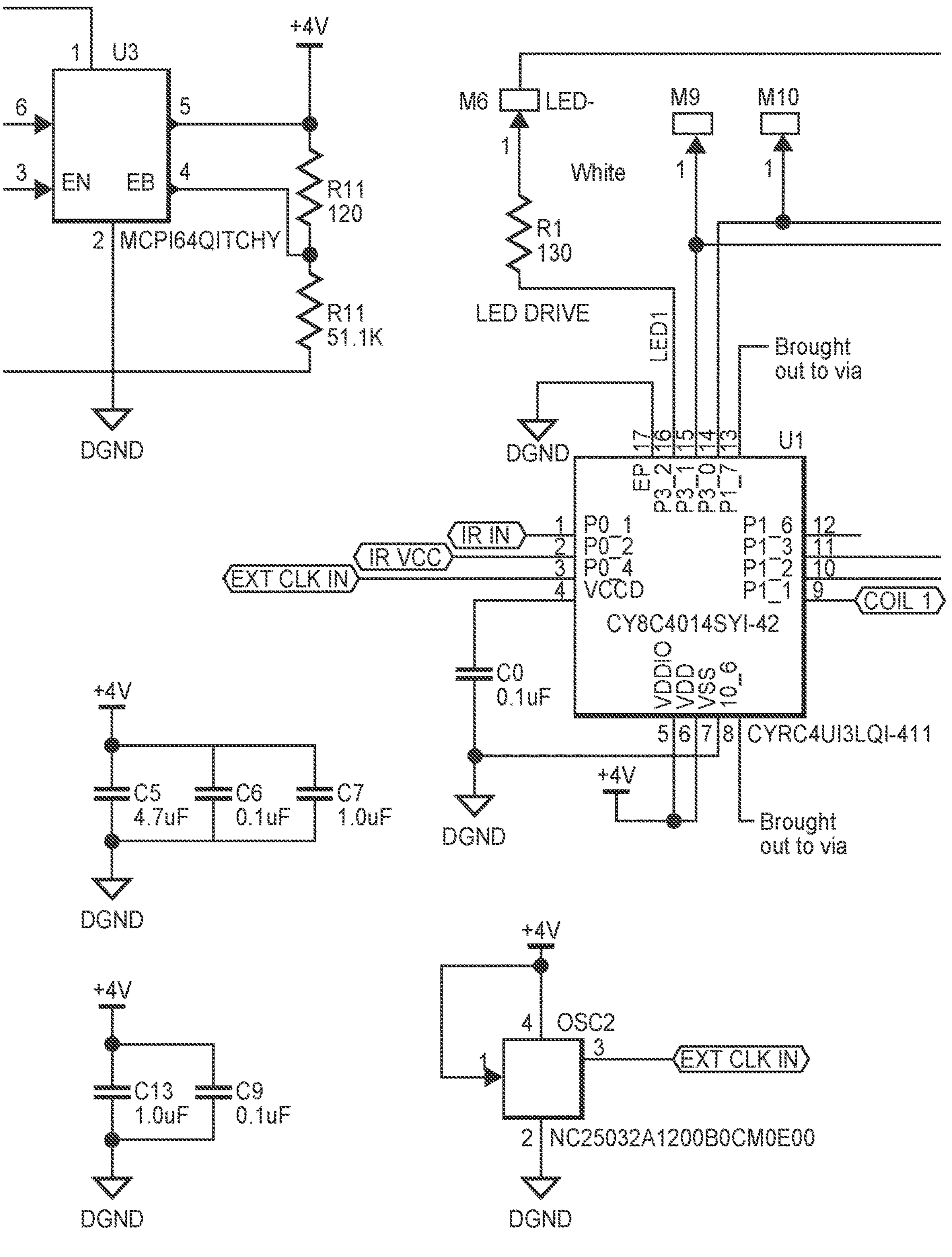
Figure 8C:
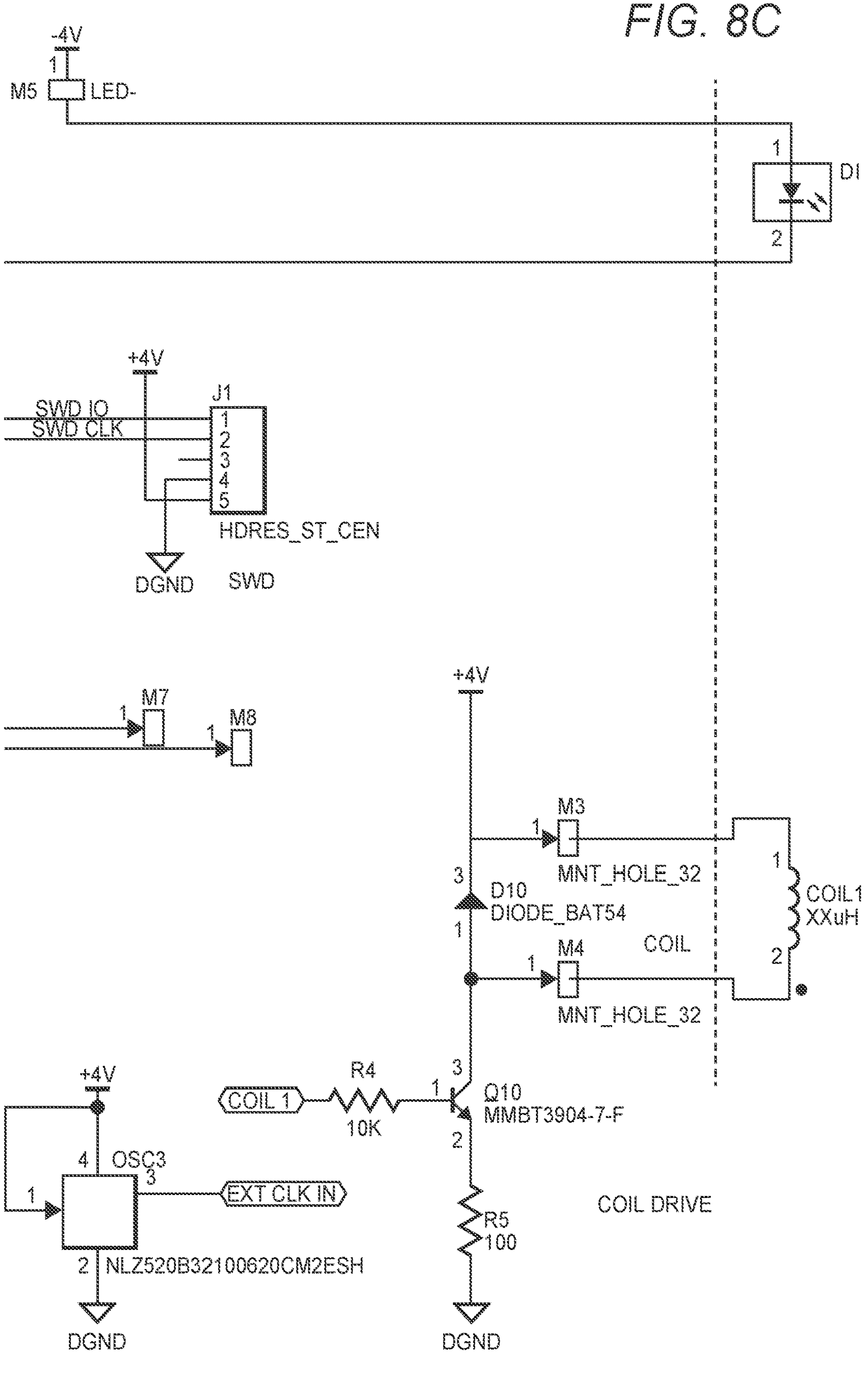

FIG. 7 is an electrical diagram of one embodiment of a switch, and FIGS. 8A-8C collectively show an electrical diagram of one embodiment of a pillar candle device.

In FIG. 9A-9B, another embodiment of an electric light device 200 is shown. Although the device is shown as having a pillar candle shape, the shape could be a tapered candle, a light bulb, or otherwise. Device 200 can include an outer housing 201. Device 200 further includes an inner housing 202 comprising a left side 202A and a right side 202B, which can optionally be coupled together using crush pins, adhesive, or other commercially suitable fastener.

A flame element 204 can be coupled to the housing 202 via wire 205, such that the flame element 204 can pivot about the wire 205 and thereby vary its position with respect to housing 202. Flame element 204 preferably includes upper and lower portions, with the upper portion disposed above where the wire 205 passes through the flame element 204, and the lower portion disposed below that point. The upper portion can include a concave surface defining a face of the flame element onto which light can be emitted by light source 208. Of course, planar and other dimensional surfaces could alternatively be used without departing from the scope of the invention. The light source 208 can emit light into cone 240, which includes a lens 242 on a distal end of the cone 240 away from light source 208. Lens advantageously focuses the light on to the flame element 204.

Although not explicitly shown, it is alternatively contemplated that the flame element 204 could be fixed in position relative to the housing 202, and in some embodiments, could be affixed directly to the housing 202 or even be unitary with the housing 202.

The device 200 can further include a circuit board 209 (controller) that fits within the housing 202. Preferably, where the flame element 204 moves with respect to the housing 202, the circuit board 209 can include an electromagnet 217 that creates kinetic motion of the flame element when magnet 228 of flame element 204 interacts with magnetic field generated by electromagnet 217. Electromagnet 217 preferably is configured to generate a magnetic field and is disposed with respect to the flame element 204 such that a magnet 228 in the lower portion of the flame element 204 interacts with the magnetic field, thereby causing movement of the flame element 204. A currently preferred magnet is a neodymium magnet composed of NdFeB and having a diameter of approximately 5 mm and a thickness of between 0.9-1.0 mm.

Rather than an electromagnet, it is contemplated that the device 200 could alternatively include a fan or other device to move air within housing 202, or a mechanical device that contacts the flame element 204 and thereby causes movement of the flame element 204.

Device 200 is preferably battery-powered and comprises a battery compartment 203 that includes a cavity that can receive one or more batteries, and metal contacts 220 disposed at either end of compartment. Cover 222 can be removably coupled to the battery compartment 203 to retain batteries in the compartment 203 when inserted. Projections 224 can extend from an outer surface of compartment, and preferably are sized to fit within recesses in housing 201 to orient compartment with respect to housing 201, and ensure proper insertion of compartment 203 within the housing 201. Device 200 can further include a switch 226 to activate the effect and light source 208.

Upper portion 228 of compartment 203 preferably includes an upward projection. Mount 230 preferably fits within the projection to thereby ensure that the components of device 200 maintain the proper position relative to one another.

It is especially preferred that the outer housing 201 can comprise a plastic material and more preferably a thermoplastic elastomer, and be co-injection molded with a wax substitute, which advantageously eliminates the need to dip the housing 201 in wax to provide a wax effect on the finished device.

FIG. 9B shows a vertical cross-section of the device 200 with exemplary distances between, and angles of, various components.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An electric device that resembles a tapered candle, comprising:

an elongated housing comprising an opening,
  wherein the elongated housing comprises an inner housing and an outer housing, the outer housing comprises a wax material to provide a wax effect on the electric device;

a pendulum that comprises an upper portion having a flame shape extruding from the opening of the elongated housing,
  wherein the pendulum further comprises a lower portion that is pivotally suspended within the elongated housing to cause movement of the pendulum so as to drive movement of the upper portion having the flame shape to mimic a real flame;

a light source positioned at an angle with respect to the pendulum within the elongated housing, wherein the light source is configured to emit light towards the upper portion of the pendulum, a circuit board positioned below the pendulum configured to control an operation of the electric device,
  wherein the circuit board has an elongated shape that fits within the elongated housing, and
  wherein the circuit board coupled to one or more indentations of the elongated housing to maintain a vertical position relative to the elongated housing, and
  wherein the elongated housing includes first and second internal projections that couple to first and second sides of the circuit board to maintain a position of the circuit board relative to the elongated housing;

a remote signal receiver coupled to the circuit board, the remote signal receiver configured to receive one or more commands from a remote controller to enable the circuit board to control the operation of the electric device;

a battery compartment that comprises a cavity configured to receive one or more batteries; and a plug coupled to the elongated housing configured to secure a bottom of the electric device, wherein a first end of the plug has a first diameter that is substantially same as a diameter of the elongated housing and a second end of the plug has a second diameter that is smaller than the first diameter to form a trapezoid profile.

2. The electric device of claim 1, wherein the circuit board is configured to turn on and off the electric device based on the one or more commands received by the remote signal receiver.

3. The electric device of claim 1, wherein the circuit board is configured to control the operation of the electric device in a timer mode in which the electric device is turned on for a preprogrammed time period and then turned off for a second preprogrammed time period.

4. The electric device of claim 3, wherein, in the timer mode, the electric device is configured to be turned off after operating for a preprogrammed time period and to be turned on again after staying off for the preprogrammed time period.

5. The electric device of claim 3, wherein, in the timer mode, the electric device is configured to be turned off after operating for five hours and to be turned on again after 19 hours.

6. The electric device of claim 1, wherein the circuit board is configured to operate the electric device in a mode in which the upper portion of the pendulum having the flame shape moves to simulate a flickering flame.

7. The electric device of claim 1, wherein the light source comprises a light emitting diode (LED).

8. The electric device of claim 1, wherein part of the pendulum is shaped as a wick to simulate a real candle.

9. The electric device of claim 1, wherein a push switch is located at a bottom of the plug, the push switch configured to turn on and off the electric device.

10. The electric device of claim 1, further comprising:

an electromagnet positioned below the pendulum, wherein the electromagnet is configured to generate an electromagnetic field that causes movement of the pendulum.

11. The electric device of claim 1, wherein an angle at which the light from the light source impinges on the upper portion of the pendulum that has the flame shape is between 20-30 degrees.

* * * * *